3,396,775
METHOD OF MAKING A SHELL MOLD
Robert K. Scott, Pittsburgh, Pa., assignor to Dresser Industries, Inc., Dallas, Tex., a corporation of Delaware
No Drawing. Filed Nov. 24, 1965, Ser. No. 509,600
5 Claims. (Cl. 164—26)

ABSTRACT OF THE DISCLOSURE

Method of producing a shell mold by coating a pattern with a refractory containing slurry and a gelling binder, stuccoing the slurry and then subjecting the stuccoed slurry to the vapors of a volatile organic base to cause setting by gelation of the slurry and adherence to the stucco.

---

Precision casting metal and other types of material cast in the molten state are used in many industries and, generally, such castings are made in expendable molds. There are three general types of processes for making the expendable molds, and these may be classified as the ceramic shell, the single investment and the double investment processes. These all have one thing in common: they are one use molds, in which the mold is generally destroyed in removing the casting from it. To provide an economical process, a master mold or pattern is initially prepared, from which a plurality of the one-time use refractory molds are made by one of the above processes.

A growing trend in the investment casting industry is to use ceramic shell molds in place of the conventional bulky investment molds and the present invention is concerned with the shell molding technique of precision casting.

Shell molds are usually prepared by dipping a disposable pattern, which is a replica of the part to be cast, into a refractory slurry consisting of a suspension of a fine refractory aggregate in a suitable bonding liquid. The binder is generally one which is capable of hardening during drying at room temperature. After dipping, the excess slurry is drained from the coated pattern and the slurry coating is sanded or stuccoed with coarser refractory particles. This process of dipping and stuccoing is repeated until a refractory shell having a sufficient thickness to resist the stresses occurring in subsequent operations is built up around the pattern. The usual thickness of the shell is from ⅛ of an inch to ½ of an inch, although thinner or heavier shells may be formed. The disposable pattern is subsequently removed from the shell mold and the mold prepared for the casting operation.

In the method above described, the period for drying between slurry coats generally varies between 30 and 45 minutes. Thus, a great deal of time is consumed in preparing ceramic shell molds. The extensive period for drying is considered necessary to harden the slurry coatings so that the subsequent slurry coatings will adhere thereto, without attacking the previously dried coats.

Another shortcoming of the above method is that when the slurry is dried, microfractures very often occur upon hardening. When the next slurry coating is applied, the binder therein may flow through the stucco and either dissolve the slurry coating, in part, or cause it to flake. It sometimes occurs that a portion of the stucco material fills the small cracks in the slurry coat; however, this is undesirable since the first coating or facing must be smooth and a coarse material embedded therein would cause roughened surfaces on cast metal parts.

Accordingly, it is an object of the present invention to reduce the amount of time normally required in forming ceramic shell molds.

Another object of the invention is to provide an improved process for forming multilayer ceramic shell molds wherein extensive drying periods between application of each layer is substantially eliminated.

A further object of the invention is to provide precision casting techniques having the advantages described above which can be carried out in a simple, inexpensive and expeditious manner.

Other objects of the invention will become apparent hereinafter.

Briefly, according to one embodiment of the invention, there is provided a method of producing a shell mold for metal casting. A disposable pattern (customarily formed from a combustible material, such as wax or a synthetic resin) is coated with a slurry consisting of a refractory aggregate and a gelling binder. The slurry coat is then dusted or sprinkled with a coarse refractory grain to provide a stucco surface thereon. The stuccoed slurry is subjected to the vapors of a volatile organic base. The vapors form a liquid condensate on the slurry and cause set by gelation thereof and additionally improved adherence of the stucco material. After gelation (which may be complete after two minutes) another slurry coat is applied to the pattern. The condensate formed on the first slurry coat additionally initiates set by gelation of the subsequent slurry coat. The second slurry coat is stuccoed and also subjected to the vapors of a volatile organic base to insure complete gelation thereof. The above steps are repeated as many times as necessary to obtain the shell thickness desired.

After the desired shell thickness is obtained, the pattern and mold are separated and the mold is cured according to techniques well known in the art.

The refractory grain used in making the mold is usually —100 mesh alumina (99.5% $Al_2O_3$, by weight, on the basis of an oxide analysis); calcined clay, mullite, silica, fused corundum, zirconia, and various spinel minerals, such as chrome ore, etc. are among the materials most commonly used.

The stuccoing material is generally much larger in particle size (i.e. —18 +50 mesh) than in the refractory aggregate used in the slurry. The shape of the particles may vary from spherical to irregular, acicular or needle-shaped grains. The materials used for stuccoing purposes are generally in the group consisting of granular zircon, fused silica, various alumina-silica grogs including sillimanite, tabular alumina and similar material.

The volatile organic base preferably is of the amine type or substituted amine having up to 10 carbon atoms. The organic base must be stable in air and should have a vapor pressure in excess of about 10 mm. of Hg of 760 mm. pressure. Preferably, the organic base has a vapor pressure between about 50 and 200 mm. at temperatures between 160° and 180° F.

The organic base is vaporized in a suitable vessel containing the coated pattern. The temperature maintained in the vessel for causing vaporization of the base must not be sufficiently high to cause deformation of the pattern material, i.e., wax. However, the vaporization temperatures employed in the present invention generally will not exceed 180° F. which causes little change in the wax temperature during the exposure period.

The organic base forms a condensate on the surface of the slurry and is soluble in the liquid carrier fluid of the binder. Since the binders employed herein are generally dissolved in an organic solvent, such as, alcohol, then the organic base must be alcohol soluble. However, many of the organic bases employed herein are also water soluble; and so, may be employed in water base binder systems. The organic base reacts with acid in the fluid binder, increasing the pH from about 2 to about 4–7 and causes gelation of the binder material.

Examples of suitable amines include mono-, di-, and trialkyl-substituted amines. Certain ring compounds having an incorporated nitrogen atom are basic in characteristics and are, therefore, useable, including pyridine, morpholine, cyclohexylamine, etc. Also useable are primary, secondary and tertiary amines, and certain other mono-, di-, and triamines which have straight alkyl chains, or a combination of the alkyl or aliphatic chain and cyclic compounds.

Preferably, the binder solution is a prehydrolyzed alkyl silicate. The alkyl silicate binder consists of a lower alkyl silicate, a selected solvent, water and a catalyzer. In this combination, the amount of silica binder, which is added, may provide between about 2 and 30 grams of $SiO_2$ per 100 ml. of the binder solution. Preferred lower alkyl silicate materials are tetraethyl orthosilicate, condensed ethyl silicate, and ethyl polysilicate.

The solvent chosen must be able to dissolve the silicate in the binder, and must be sufficiently miscible with water so as to completely hydrolize the organic radical in the selected binder silicate. The commercial solvent, "Synasol," is particularly satisfactory. "Synasol" is 190 proof ethanol, denatured with one gallon of methyl isobutyl ketone, one gallon of ethyl acetate (87%), and one gallon of aviation gasoline per 100 gallons. Other organic solvents, such as, 190 to 200 proof methanol and propanol are also satisfactory.

The catalyzer employed in the binder solution may be such as hydrochloric acid or sulfuric acid in a quantity sufficient to maintain the pH of the binder solution below about 3.

In a preferred embodiment of the invention, there should be no more water in the binder solution beyond that necessary to completely hydrolyze the alkyl radical in the organic silicate binder. If there is an excess of water, the silica content of the organic silicate binder tends to hydrate and results in a mold which is too strong and will not separate as easily as desired from a cast shape. Insufficient water is acceptable in some instances; but, when a mold cast with a binder solution containing considerably less water than that required for complete hydrolyzation comes in contact with hot metal there is carbonization with evolution of carbon dioxide gas bubbles which results in pin holing of the metal casting. Workable binder solutions may be made, when there is at least about 60% of the water required for complete hydrolyzation of the organic portion of the silicate binder. As 60% is approached less satisfactory mixtures result. These mixes, however, are quite satisfactory for some less critical casting operations.

Preferably, the proportions of binder ingredients that are utilized herein are those disclosed and claimed in copending application Ser. No. 223,623, filed Sept. 14, 1962, now Patent No. 3,262,792, assigned to a common assignee which is incorporated herein by reference.

Merely by way of example, 400 grams of −200 mesh mullite is mixed with 100 cc. of a binder solution containing 18% $SiO_2$, by weight, derived from ethyl silicate (40% $SiO_2$ content). Water in this 100 cc. of binder solution to allow 83% hydrolyzation is about 6 cc. Hydrochloric acid to yield a pH of approximately 2 amounts to about 1 cc. To obtain the 18%, by weight, $SiO_2$, about 40 cc. of the 40%, by weight, $SiO_2$ ethyl silicate is mixed with about 50 cc. of ethyl alcohol. After thorough mixing of the grain and binder solution, a wax pattern is dipped into the slurry and removed, the excess slurry being allowed to drain off the wax pattern. While still wet, the coated wax pattern is inserted in a fluidized bed of sand to obtain a roughened stucco coat thereover.

The coated wax pattern is placed in a vessel containing vapors of pyridine until about .3%, by weight, of the vapor, based on the weight of the slurry, is deposited on the slurry coating as a condensate. The pattern is removed from the vessel and set by gelation of the slurry occurs in about 4 minutes. The dipping, stuccoing and vapor deposition steps are repeated until a refractory shell of about $3/16''$ is deposited over the wax pattern.

The coated wax pattern is placed in a muffle furnace and shock heated to 1900° F., and retained therein until all the wax is removed. The mold is then cooled to room temperature and is ready for the casting of molten metals.

It is intended that the foregoing description be construed as illustrative and not in limitation of the invention.

Having thus described the invention in detail and with sufficient particularity as to enable those skilled in the art to practice it, what is desired to have protected by Letters Patent is set forth in the following claims.

I claim:
1. In the method of producing a shell mold for metal casting, the steps comprising coating a pattern of disposable material with a slurry consisting of a refractory aggregate and a gelling binder, stuccoing said slurry, subjecting the stuccoed slurry to the vapors of a volatile organic base, said vapors forming a condensate on said slurry and causing set by gelation thereof and adherence to the stucco, repeating coating of the pattern with slurry and stucco, and subjection thereof to vapors of the organic base, to the thickness desired, the condensate formed on the slurry initiating set by gelation of subsequently applied slurry.

2. The method of claim 1 in which the gelling binder is a prehydrolyzed lower alkyl silicate.

3. The method of claim 1 in which the volatile organic base is an alcohol soluble amine which is stable in air and has a vapor pressure in excess of about 10 mm. at 760 mm. pressure and ambient temperatures.

4. The method of claim 3 in which the volatile organic base contains up to about 10 carbon atoms.

5. The method of claim 3 in which said amine has a vapor pressure of about 50 to 200 mm. at a temperature between about 160 and 180° F.

References Cited
UNITED STATES PATENTS

| | | | |
|---|---|---|---|
| 2,806,270 | 9/1957 | Shaul | 164—26 |
| 2,987,789 | 6/1961 | Moren | 164—16 |
| 3,032,426 | 5/1962 | Lee | 164—16 X |

FOREIGN PATENTS

| | | |
|---|---|---|
| 1,004,278 | 9/1965 | Great Britain. |

J. SPENCER OVERHOLSER, *Primary Examiner.*

E. MAR, *Assistant Examiner.*